Oct. 15, 1968   D. H. CREEL   3,405,969
VISOR
Filed Nov. 21, 1966   2 Sheets-Sheet 1

INVENTOR.
D. H. CREEL
BY
Young & Quigg
ATTORNEYS

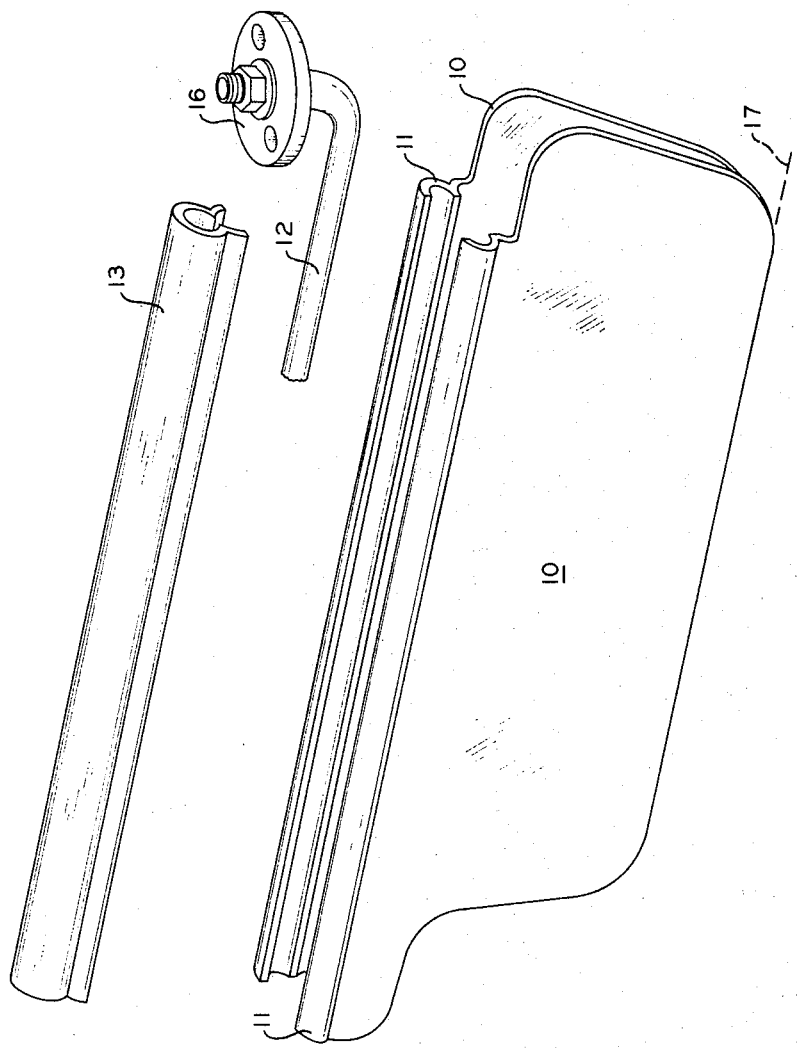

United States Patent Office 3,405,969
Patented Oct. 15, 1968

3,405,969
VISOR
Donald H. Creel, Whitmore Lake, Mich., assignor to
Phillips Petroleum Company, a corporation of
Delaware
Filed Nov. 21, 1966, Ser. No. 595,722
9 Claims. (Cl. 296—97)

ABSTRACT OF THE DISCLOSURE

A visor forming structure wherein a sheet of foldable material forms the body of a visor when folded about a fold line; the sheet having first and second hinge elements substantially parallel to the fold line; the elements cooperating to form a continuous longitudinal hinge seat when the sheet is folded.

---

In one aspect, this invention relates to visors or glare shields. In another aspect, this invention relates to a visor forming structure.

Visors of the type used in automobiles and other vehicles to shield the eyes of an occupant from the rays of the sun have required relatively complicated mechanisms to insure that the visor will remain in the selected position despite the vibrations of travel. In some mechanisms, repeated use of the visor produces wear and the visor will not remain in the desired position. Often the mechanism or visor is constructed in such a manner or of such material that the visor provides a hazard to the occupants in vehicle accidents.

It is an object of the invention to provide an economically manufactured visor forming structure.

Another object of the invention is to provide a visor which is fabricated from a minimum number of parts, which is of simple construction, and which is easily and quickly assembled.

Another object of this invention is to construct a visor which presents a minimum hazard to occupants in vehicle accidents.

Other objects and advantages of the invention will become apparent to one skilled in the art upon consideration of the following specification, the drawings, and the claims.

FIGURE 2 is an exploded view of the elements of the visor shown in FIGURE 1.

According to the invention, a sheet of foldable material having a fold line and hinge elements of concave curvature incorporated in edges of the sheet parallel to the fold line is folded about the fold line to form a visor body and a continuous longitudinal hinge seat.

Further in accordance with the invention, the visor forming structure, described above, is combined with a hinge pivot means fitting into the hinge seat, a support means for the hinge pivot means and a clamping member fitting over the hinge elements which holds the hinge elements together and in frictional contact with the hinge pivot means to form a visor.

Figure 1:
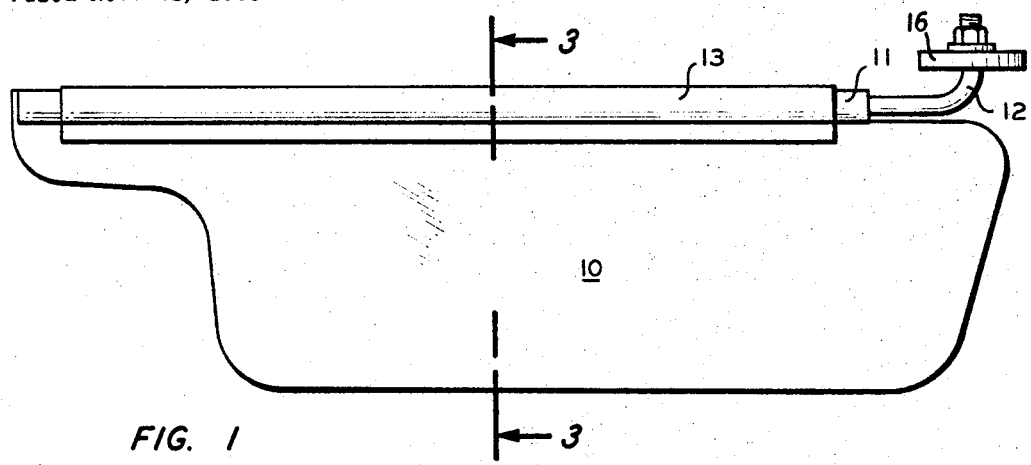
FIGURE 1 is an elevation view of the visor forming structure assembled with the other elements in a visor.

Referring now to the drawings wherein like reference numerals designate like elements in the different views, FIGURE 1 shows the visor forming structure 10 in its folded position with hinge elements 11 cooperating to form an open ended bore through which the hinge pivot means, a shaft 12, extends. A clamping member 13 is fitted over the cooperating hinge elements to hold them together in frictional engagement with shaft 12.

The free ends of the visor forming structure 10 can be sealed by any suitable means, such as heat sealing, gluing, sewing, or the like to form an attractive visor. The sun visor is secured at an appropriate position in a vehicle by means of a pivotal connector element 16. The connector element 16 supports the visor and permits it to be pivoted about an axis substantially normal to the plane of the surface to which the visor is attached.

FIGURE 2 shows the double wall visor forming structure 10 having hinge elements 11 in an exploded view. The structure 10 is made from a sheet of foldable material shaped to form the visor body when folded along a fold line as shown as phantom line 17. The hinge elements are incorporated into the edges of the sheet which are substantially parallel to the fold line 17. Hinge elements 11 are illustrated as being semicircular and of slightly less diameter than shaft 12 but need be only of sufficient concave curvature to form a channel for seating hinge pivot means 12. Clamping member 13 is shown as a flanged split tubular sleeve but other types of spring clip means can be used.

Figure 3:
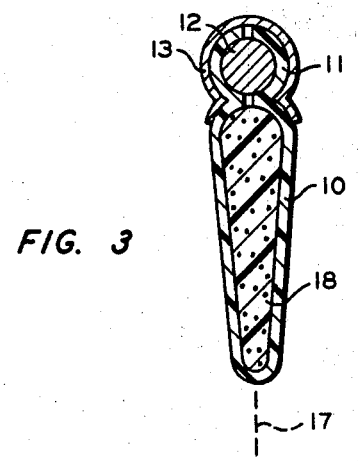
FIGURE 3 is a cross sectional view of the sun visor taken along line 3—3 of FIGURE 1.

In FIGURE 3, a cross section of the visor, the foldable sheet 10 is folded about the fold line 17 with hinge elements 11 on the outer edges of sheet 10 cooperating to form a continuous longitudinal seat for shaft 12. If desired, the space enclosed by the folded sheet 10 can be filled with padding 18. Foamed plastic material such as polyurethane, polystyrene, or polyethylene, can be utilized as padding.

Figure 4:
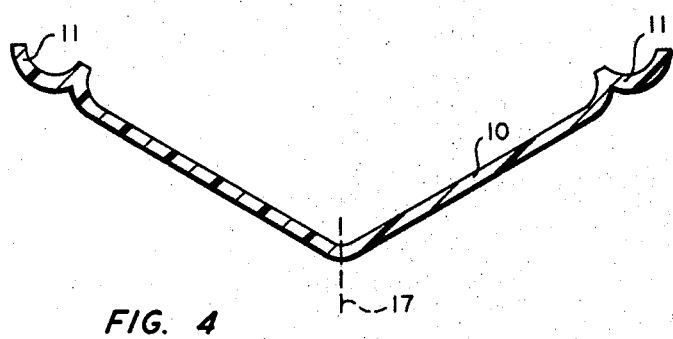
FIGURE 4 depicts the visor forming structure in a partially folded position.

In FIGURE 4, the visor forming structure, sheet 10 and hinge elements 11, is shown in a partially folded cross section. The structure is made of suitable foldable material. It is preferred to use a foldable resilient plastic, such as polyethylene or polypropylene so that the structure may be easily fabricated by molding, extruding and/or post-forming methods.

The visor forming structure of this invention has a minimum number of elements which are easily fabricated and can be readily assembled to provide an attractive visor. Because of its folded construction, there is no need for a rigid member in that edge of the visor which presents the greatest hazard to occupants of a vehicle.

Reasonable modification and variation are within the scope of this invention which forms a novel visor and visor forming structure.

That which is claimed is:

1. A visor forming structure comprising:
   a sheet of foldable material shaped to form the body of said visor when folded along a fold line; and
   first and second hinge elements of concave curvature incorporated into said sheet substantially parallel to the fold line, said hinge elements cooperating to form a continuous longitudinal hinge seat in the form of an open ended bore when said sheet is folded along said fold line.

2. The article of claim 1 wherein said foldable material comprises a resilient thermoplastic material.

3. The article of claim 2 wherein said resilient thermoplastic material comprises polyethylene.

4. A visor for an automobile or other vehicle comprising:
   the visor forming structure of claim 1, said sheet being folded along a fold line to form the body of said visor;
   hinge pivot means cooperating with the continuous seat thus formed;
   support means for said hinge pivot means; and a clamping member fitting over said hinge elements effective to hold said hinge elements together and in frictional engagement with said hinge pivot means.

5. The article of claim 4 wherein said foldable material comprises a resilient thermoplastic.

6. The article of claim 5 wherein said resilient thermoplastic material comprises polyethylene.

7. The article of claim 4 wherein said clamping member comprises a split tubular sleeve.

8. The article of claim 4 wherein padding is contained in the space enclosed by said sheet when said sheet is folded.

9. The article of claim 5 wherein the resilient thermoplastic material comprises polypropylene.

References Cited

UNITED STATES PATENTS

| 2,629,626 | 2/1953 | Ziler | 296—97 |
| 3,032,371 | 5/1962 | Berridge et al. | 296—97 |

FOREIGN PATENTS

| 574,552 | 3/1958 | Italy. |
| 864,091 | 3/1961 | Great Britain. |

BENJAMIN HERSH, *Primary Examiner.*

L. D. MORRIS, *Assistant Examiner.*